Oct. 5, 1943.   H. O. FOSSUM   2,331,179
DIAMOND DRILL
Filed April 21, 1942   5 Sheets-Sheet 1

INVENTOR
HENRY O. FOSSUM.
BY
Raymond G. Mullee
ATTORNEY

Oct. 5, 1943.    H. O. FOSSUM    2,331,179
DIAMOND DRILL
Filed April 21, 1942    5 Sheets-Sheet 2
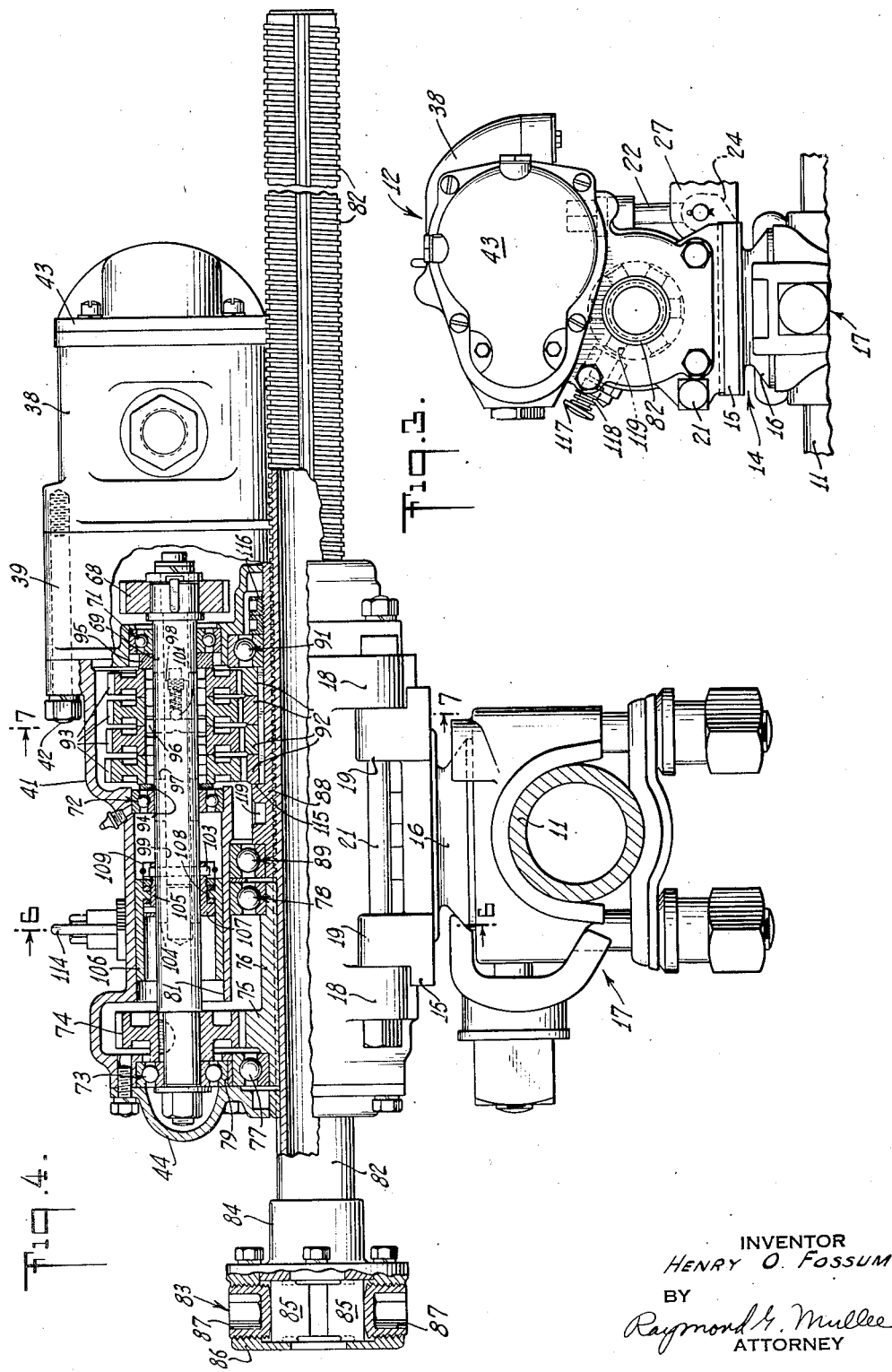
INVENTOR
HENRY O. FOSSUM.
BY
Raymond G. Mullee
ATTORNEY

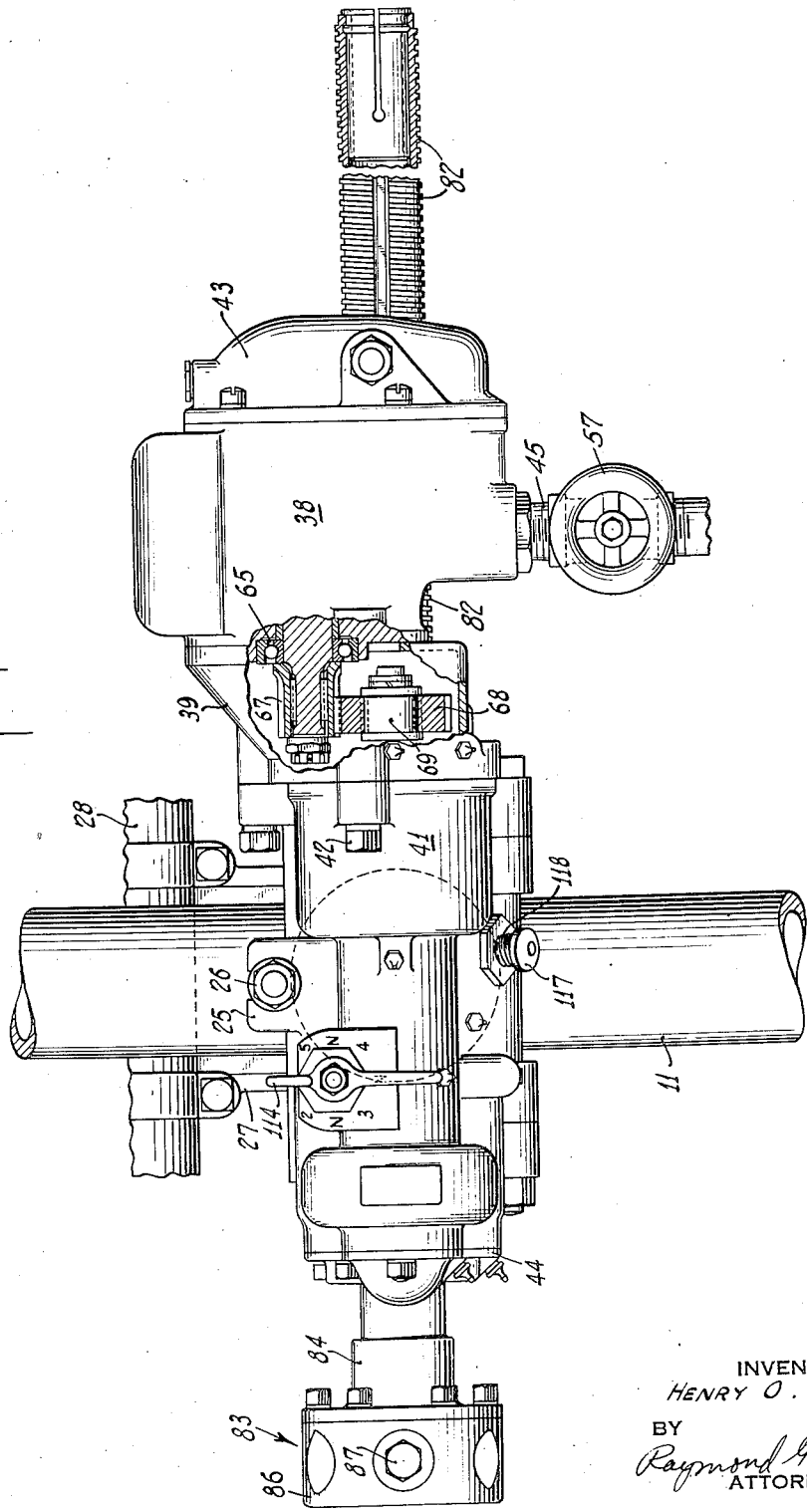

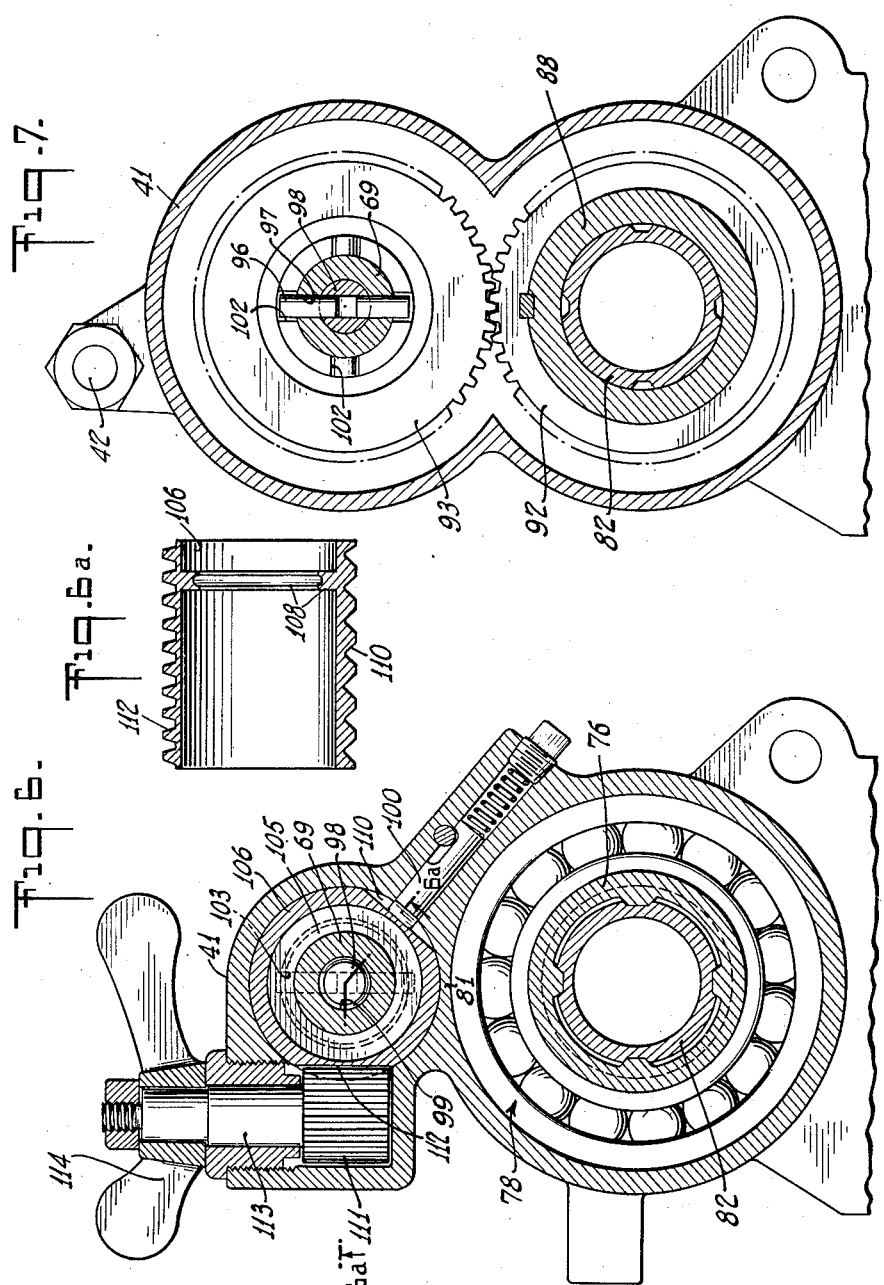

Oct. 5, 1943.   H. O. FOSSUM   2,331,179
DIAMOND DRILL
Filed April 21, 1942   5 Sheets-Sheet 5

INVENTOR
HENRY O. FOSSUM.
BY
Raymond G. Mullee
ATTORNEY

Patented Oct. 5, 1943

2,331,179

UNITED STATES PATENT OFFICE 2,331,179

DIAMOND DRILL

Henry O. Fossum, Detroit, Mich., assignor to Chicago Pneumatic Tool Company, New York, N. Y., a corporation of New Jersey Application April 21, 1942, Serial No. 439,855

3 Claims. (Cl. 255—47)

This invention relates to mining drills and more particularly to diamond drills adapted for prospecting or for blast-hole drilling in the drifts and stopes of mines.

Diamond core drills operate on the rotary principle and bore a hole in the earth with a diamond studded hollow bit secured to one end of a sectional drill rod. This method of drilling produces cores of cut material, useful as samples of the earth's formation. In this and other respects a diamond drill is distinguished from the conventional rock drill which operates by driving a solid pointed bit through the work by delivering to it repeated percussive impulses.

The essential elements of the diamond drill are a feed screw through which the drill rod is passed, a chuck connecting the feed screw to the rod, and a feed nut engaged with the feed screw by a threaded connection operative to advance and retract the feed screw upon relative rotary movement between the elements. A motor and a countershaft establishing positive driving connections between the motor and the feed screw and feed nut complete the operating structure of the drill.

The object of the present invention is generally to reorganize the construction of the light diamond drill to obtain a tool which is lighter in weight yet more powerful than its predecessors and which may be controlled and operated more easily and at less cost in time and motive power.

Specific features of advantage are gained by placing the motor, the feed screw and the countershaft parallel to one another where they may be connected by complementary spur gears and enclosed by a dust proof, oil tight tubular housing. According to this construction the drive of the feed screw and feed nut is effected through the countershaft. Heretofore the motor has been disposed at right angles to the countershaft and the feed screw, and connected thereto by bevel gears leading directly to the feed screw. The prior assembly thus did not lend itself to easy manipulation, required the use of expensive gearing, and, because its drill mount necessarily was disposed some distance from the feed screw, the reaction of the drilling pressure tended to rock the tool out of alignment with the drill hole.

It further is contemplated that by this invention provision shall be made in the drilling apparatus for mechanical means to pull the drill rod into and out of the hole. The rod puller is designed to be attached to the drill mount side by side with the drill, and the two elements arranged to be rocked into and out of alignment with the drill hole for alternative use. Preferably, the drill motor and the rod puller both are operated by compressed air.

Another feature of the invention is an improved form of indexing apparatus operable to initiate changes in the speed ratio between the countershaft and the feed nut through a selective control of intermediate gear trains.

Other objects and structural details of the invention will be apparent from the following description when read in conjunction with the accompanying drawings, wherein:

Fig. 3 is a fragmentary end view similar to Fig. 2, showing the drill in working position;

Fig. 4 is a side view of the drill, partly in longitudinal section;

Fig. 5 is a top plan view of the drill, part of the housing being broken away to show the connection of the motor shaft to the countershaft;

Fig. 6 is a view of the drill, in cross section, taken substantially along the line 6—6 of Fig. 4;

Fig. 6a is a detail view of the indexing sleeve, taken along the irregular line 6a—6a of Fig. 6;

Fig. 7 is a view of the drill, in cross section, taken substantially along the line 7—7 of Fig. 4;

Figure 1:
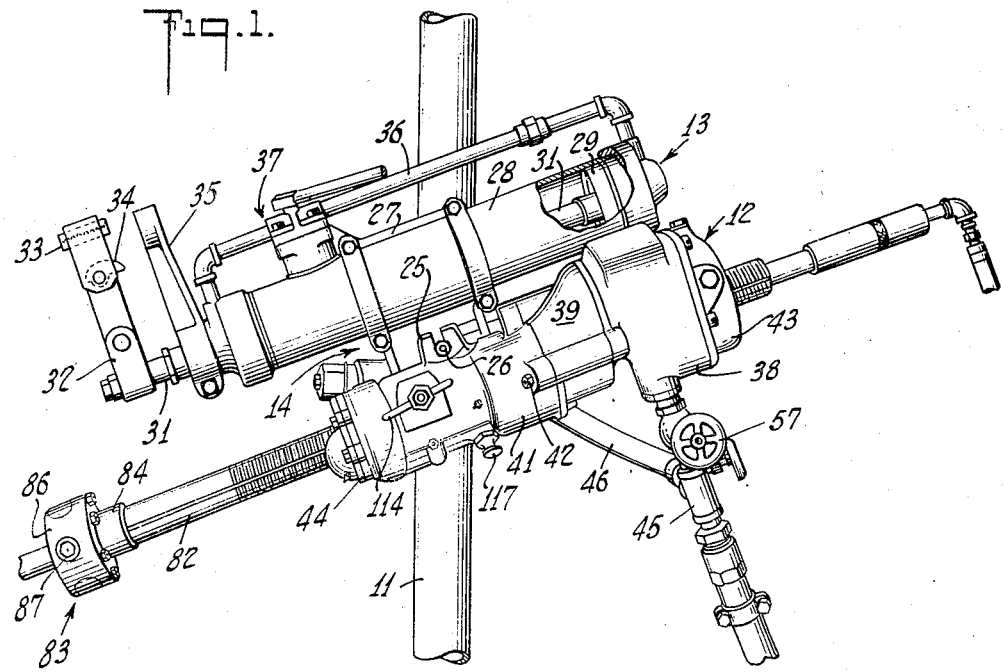
Fig. 1 is a plan view of the drilling apparatus, including the rod puller, mounted on a stationary cross bar.
Figure 2:
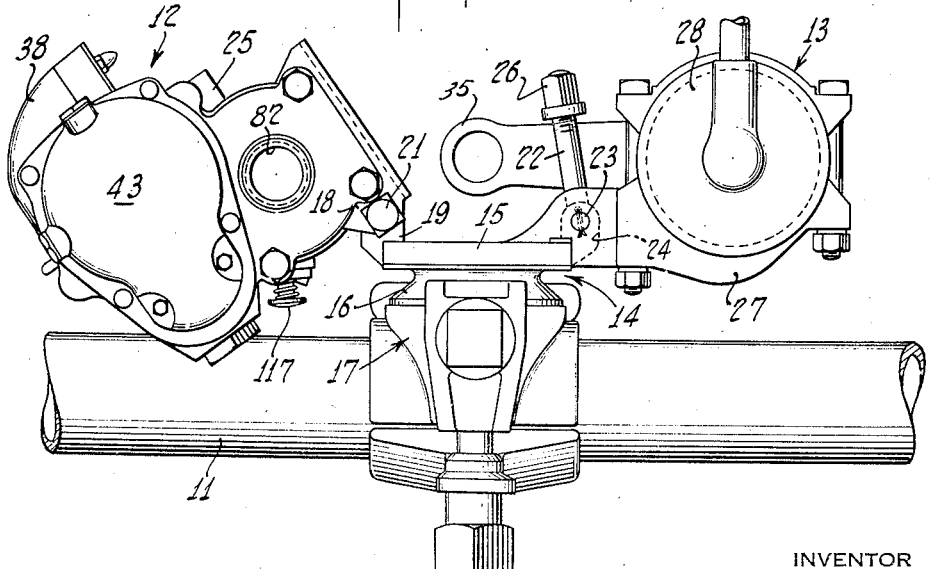
Fig. 2 is a rear end view of the drilling apparatus, showing the drill rocked out of working position and showing a guide arm of the rod puller engaged with the drill rod.

Although operable independently of any auxiliaries the drill is most effectively used in conjunction with the pressure fluid operated puller which may be coupled to and uncoupled from the drill rod and operated to move the rod into and out of the drill hole, thereby relieving the operator of the manual effort of such work. According to the present invention the drill and the rod puller form an assembly and are supported on a common drill mount for pivotal movement relative to the mount into and out of alignment with the drill hole. Referring to Figs. 1, 2 and 3, the assembly comprising the drill, the rod puller and the drill mount is shown supported on a stationary bar 11, the several elements being indicated respectively at 12, 13 and 14. The drill mount 14 provides a base plate 15 for the drill 12 and a conical projection 16 adapted to fit within a saddle 17 clamped to the bar 11. Although held against movement out of the saddle 17 the conical projection 16 is rotatable therein so that the drill mount may be turned to any position of rotation relative to the stationary bar 11. Thus, in its mounting, the drill resembles a rock drill of the well known drifter type. Like the drifter, it is well suited for use in confined areas, such as mine shafts, where ease of control and wide range of movement are necessary to efficient operation.

The drill 12 rests on the plate 15 and is attached thereto by a hinge formed of complementary lugs 18 and 19 (Fig. 4), on the drill and on the plate, through which a bolt 21 is passed. Normally securing the drill from rocking movement about the hinge is an eye-bolt 22 pivotally mounted on a pin 23 carried by lugs 24 on the plate 15 on the side opposite hinge bolt 21. The upper end of the bolt 22 is, in the working position of the drill (Figs. 1, 3 and 5), received in a slotted projection 25 on the drill housing, and has a nut 26 which may be turned into locking engagement with the projection. When it is desired to move the drill out of working position the nut 26 is loosened and the eye-bolt 22 is swung out of the slotted projection 25. The drill thereby is released for movement to the position shown in Fig. 2 where it may rest on the bar 11 while the puller 13 is operated to advance or retract the drill rod.

The rod puller 13 is arranged parallel to the drill 12 and is supported by a bracket 27 extending laterally from plate 15. The puller comprises an elongated cylinder 28, a piston 29 in the cylinder and a piston rod 31 extending forwardly through the front end of the cylinder. Outside the cylinder the piston rod 31 supports an arm 32 adapted to be rocked into cooperative relation with the drill rod and engaged therewith through gripping elements 33 and 34. The latter is a cam dog oscillated to effective and ineffective positions as the piston rod reciprocates. A guide arm 35 is mounted on the front of cylinder 28 and also may be swung into and out of cooperative relation with the drill rod. Reciprocation of the piston 29 and of the gripping arm 32 movable therewith is effected by pressure fluid admitted to opposite ends of the cylinder 28 through a pipe 36 under the control of a four-way valve 37.

Figure 8:
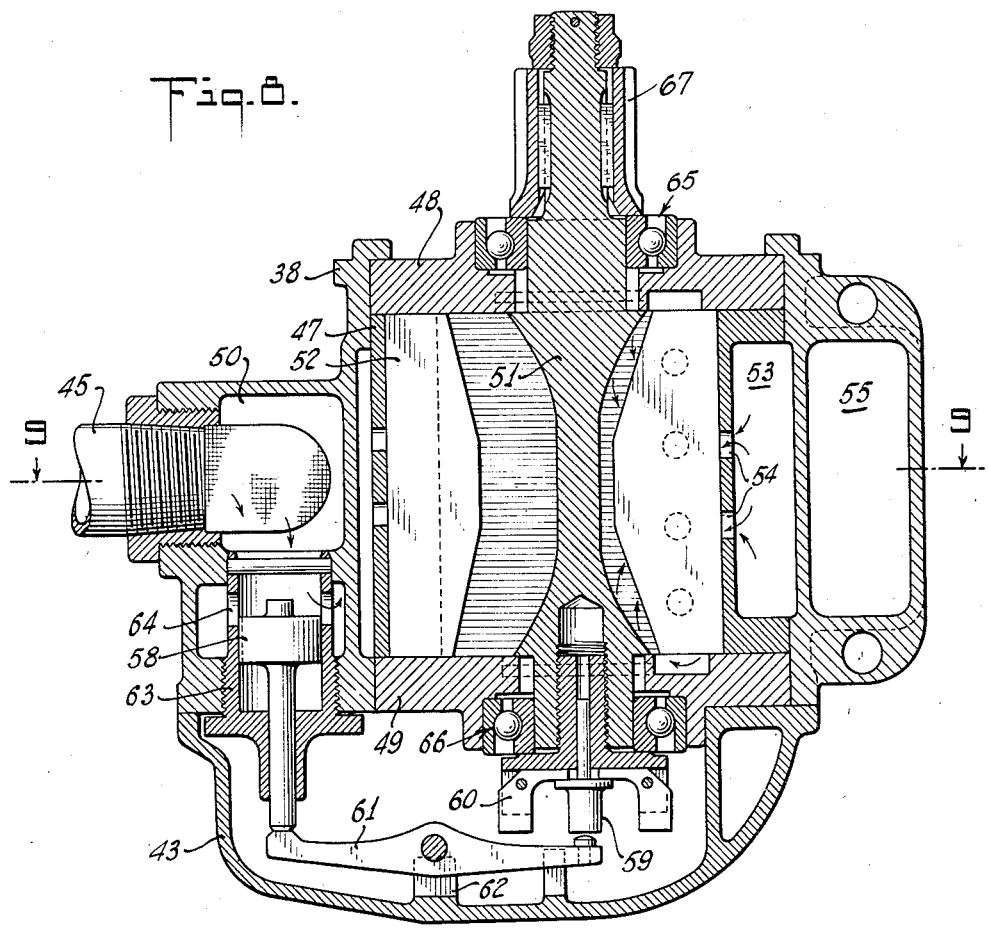
Fig. 8 is a detail view, in longitudinal section, of the rotary air motor embodied in the drill.
Figure 9:
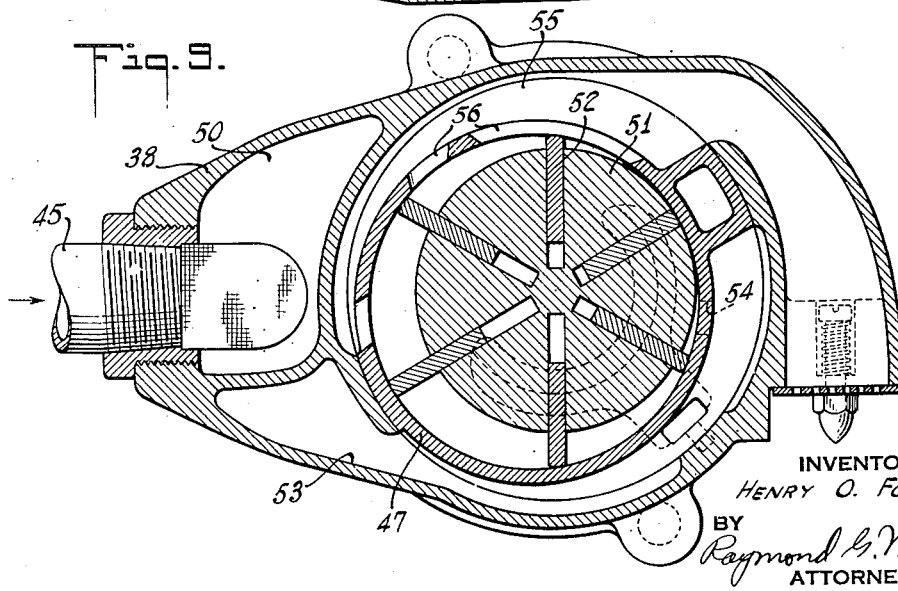
Fig. 9 is a view of the motor, in cross section, taken substantially along the line 9—9 of Fig. 8.

Considering now the construction and mode of operation of the drill 12 it will be seen that the mechanism of the drill is enclosed by a housing made up of tubular sections 38, 39 and 41, joined in end to end relation by studs 42. The opposite ends of the housing assembly are closed by plates 43 and 44. The rear housing section 38 contains a compressed air operated rotary motor supplied with fluid through a hose connection 45 (Fig. 1), a branch 46 of which leads to the rod puller 13. As shown in Figs. 8 and 9, the rotary motor is representative of a class of motors long used in pneumatic tools because of their high torque capabilities and sensitive response to throttle regulation. The elements of the motor include a ported cylinder 47, end plates 48 and 49 therefor, and an eccentrically positioned rotor 51 supported between the end plates for relative rotary movement. The crescent shaped chamber so defined in the cylinder 47 is partitioned by radial vanes 52 carried by the rotor 51 and urged outward into contact with the wall of the cylinder during operation of the motor. The partitioned areas within the cylinder, formed by the vanes 52, are connected successively to the source of live air and to exhaust as the rotor turns. The air entering housing section 38 through connection 45 is directed from an air inlet 50 through ports and passages leading to an arcuate chamber 53 surrounding one side of the cylinder 47 and communicating with the interior of the cylinder through a set of ports 54. On the opposite side of the cylinder is a chamber 55 open to exhaust and communicating with the interior of the cylinder through ports 56. The supply of air to the motor is controlled by an inlet valve (not shown) adjustable by a hand operated knob 57 (Fig. 1) to increase and reduce the rate of flow of the fluid to live air chamber 53 and thereby vary the speed of the motor. To limit the free speed of the motor, a governor apparatus is provided comprising a governor valve 58, a plunger 59 supported at one end of the rotor 51 outside the plate 49 and operable by centrifugal weights 60, and an intermediate lever 61 pivotally mounted on an internal abutment 62 of the closure plate 43. In response to an increased speed of operation of the rotor, approaching a predetermined maximum, the weights 60 rock outward pressing the plunger 59 against the lever 61 which is caused to turn in a clockwise direction (Fig. 8) and depress the valve 58. The governor valve reciprocates within a bushing 63 and controls the passage of air through a set of ports 64 therein, which ports establish communication between the air inlet 50 and the chamber 53.

The rotor 51 is mounted in bearings 65 and 66 in the end plates 48 and 49, and, outside the plate 48, has a splined connection with a driving gear 67. This construction, it will be noted, is a departure from conventional practices in that the driving gear, being separate from the rotor, may be independently replaced when worn. Heretofore the driving gear has been formed integrally with the rotor and could be renewed only by installing a complete new unit consisting of the rotor and gear. The driving gear 67 is encircled by the intermediate housing section 39 and is meshed with a spur gear 68 (see Fig. 4) secured to one end of a countershaft 69. The shaft 69 parallels the rotor 51 of the motor and is supported in bearings 71, 72 and 73 located respectively in the upper portions of housing sections 39 and 41 and closure plate 44. Adjacent its opposite or front end the countershaft has a gear wheel 74 secured thereto, this gear being engaged with an annular toothed flange 75 of a sleeve 76 spaced from and parallel to the countershaft. At its extremities the sleeve 76 is mounted in bearings 77 and 78 stationed between the lower internal wall of housing section 41 and internal ribs 79 and 81. The sleeve 76 surrounds an externally threaded tubular member 82 which is the feed screw. The feed screw extends through the housing sections 39 and 41 and is splined to the sleeve 76 which functions as a driving member, causing the feed screw to turn constantly with the countershaft 69 during operation of the motor. The drill rod is fed section by section through the feed screw 82 and may be alternatively clutched to and released from the feed screw by a chuck mechanism 83 on the outer end of the screw. The chuck assembly 83 is disclosed and claimed in Patent No. 2,297,140 granted to this inventor September 29, 1942. Briefly considered, the chuck comprises a body portion 84 secured to the feed screw, radially movable chuck jaws 85 within the body portion, and a cup-shaped housing 86 bolted to the body portion 84 and carrying set screws 87 manually adjustable to tighten and release the chuck jaws with respect to the drill rod.

The rotary motion of the countershaft 69 is used also to effect an automatic advance of the feed screw 82 and a consequent axial movement of the drill rod into the work as the drilling progresses. According to the present invention, the rate of advance of the feed screw may be controlled and its speed of movement varied within a predetermined range as changes in the earth's formation are encountered. Forming a part of the mechanism for advancing the screw 82 is a feed nut 88 surrounding the feed screw rearward of the driving sleeve 76 and in threaded engagement with the screw. The feed nut is rotatable within bearings 89 and 91 and carries on its outer periphery four gear wheels 92 all keyed to the nut for rotation therewith. The set of gears 92 is in constant mesh with a set of gears 93, each of which is mounted on the countershaft 69 for rotation independently of the shaft and of each other. The gears 93 lie between the bearings 71 and 72 and are held against longitudinal displacement by washers 94 and 95 on the opposite ends of the assembly. The several elements 93 differ in the number of teeth which they bear so that each is adapted to drive its respective gear 92 at a different speed. The gears 93 are selectively connected to the countershaft 69 by means of a pin or key 96 (see also Fig. 7) extending transversely through a slotted portion 97 of the shaft and movable longitudinally within such portion. The key 96 is carried by a rod 98 disposed in a longitudinal bore 99 within the countershaft. A spring pressed detent 101 is positioned in the rearward end of the rod 98 and engages the key 96 at its midportion to prevent lateral movement thereof. The opposite ends of the key 96 project from opposite sides of the shaft 69 and are arranged to enter either of a pair of keyways 102 (Fig. 7) formed in the inner periphery of each of the gears 93.

The rod 98 is shiftable longitudinally within the bore 99 by an indexing apparatus operative to engage the key 96 with one or another of the gears 93 or to place the key in a neutral position out of engagement with any of the gears. Near its forward end the rod 98 carries a second transverse pin 103 movable within a longitudinal slot 104 in the shaft 69. Outside the shaft 69 the opposite ends of the pin 103 are engaged in openings in a collar 105 surmounting the shaft. The collar 105 is in turn surrounded by a sleeve 106 reciprocable within a bore defined by the internal rib 81 and the upper wall of the housing section 41. In order to lock the sleeve 106 and collar 105 for sliding movement together the collar is formed with a head 107 engageable with an internal flange 108 on the sleeve and held in juxtaposition to the flange by a nut 109 threaded on to the collar on the opposite side of the flange. Thus upon movement of the sleeve 106 longitudinally along the shaft 69 the rod 98 is shifted within the bore 99 and the key 96 thereby moved into and out of the keyways 102 of the several gears 93. Actuation of the assembly comprising the sleeve 106, collar 105, rod 98 and key 96 is accomplished by a shifter pinion 111 (see Fig. 6) disposed at right angles to the sleeve 106 and engaged with a toothed area 112 formed as a rack on the outer surface of the sleeve (see Fig. 6a). The sleeve 106 is held against rotary movement by a spring pressed plunger 100 opposite a series of transverse notches 110 on the sleeve and riding into and out of engagement with successive notches as the sleeve is moved. The plunger 100 and cooperating notches 110 serve also as detent means, acting yieldingly to hold the key 96 in registry with a gear 93. The pinion 111 is fast on the lower end of a stub shaft 113 extending upward out of the housing 41 and having a hand lever 114 secured to its outer end. By turning the stub shaft 113 about its axis the sleeve 106 and thereby the key 96 may be set to a selected position of adjustment. To aid in such positioning numerals may be inscribed on the housing around stub shaft 113 (see Fig. 5), which numerals, in cooperation with the lever 114, may be used to indicate the presence of the key 96 in a predetermined index position. When neutrally positioned, as in Fig. 4, the key 96 lies between a pair of gears 93 and is ineffective. Accordingly, the countershaft 69 rotates independently of the feed nut transmission gears, and the nut is merely carried by the screw 82 without any relative movement between the elements taking place. However, when the key 96 is moved out of neutral position, and brought to rest in a keyway 102 of a gear 93, a positive drive is effected from the shaft 69 through the selected gear 93 and its associated gear 92 and thereby to the feed nut 88. The several transmission gears between the shaft 69 and the feed nut 88 are, in each instance, adapted to impart to the feed nut a speed greater than that at which the feed screw 82 is turned by the gear 74. Because of its higher speed the feed nut tends to advance along the feed screw but is locked against longitudinal movement by an external shoulder 115 abutting one side of the bearing 91 through gears 92, and by lock nuts 116 engaging the other side of bearing 91. The feed screw 82, however, is free to move in a longitudinal direction and so is constrained by the feed nut to move axially forward, the rate of advance being determined by the selection of a particular gear 93.

In the illustrative embodiment of the invention the feed screw has a forward travel of about twenty-four inches. When the feed screw has reached its limit of movement the chuck 83 must be released and the screw retracted to starting position, relative to the drill rod, whereupon the chuck is again tightened and advance of the feed screw again initiated. In the present tool, return of the feed screw to starting position is effected automatically by holding the feed nut 88 immovable while the screw is positively driven as before and in the same direction of rotation. The result, since the countershaft is imparting rotation to the feed screw in a clockwise direction (as viewed from the right hand end of the tool) and since the engaging threads of the screw and the feed nut have a left hand winding, is that the feed screw will back away from the work, moving axially rearward toward the position of Fig. 5. The feed nut 88 is locked against rotary movement by a plunger 117 radially movable in the wall of housing 41 and pressed outward by a spring 118 surrounding the stem of the plunger. The inner end of the plunger 117 is adapted to enter one of a plurality of recesses 119 (one shown) in the external shoulder 115 of the feed nut 88, and, when positioned in a recess, effectively prevents rotation of the feed nut. In retracting the feed screw, the index key 96 is set to a neutral position and the plunger 117 is then depressed and held in engagement with the feed nut until the screw has returned the desired distance.

What is claimed is:

1. A diamond core drill or like device comprising a feed screw, a feed nut, a countershaft having driving connections with said feed screw and said feed nut, reciprocable indexing apparatus controlling the driving connection between said countershaft and said feed nut to vary the speed ratio between said elements, a motor geared directly to said countershaft, and a housing completely enclosing the working parts of the drill except for said feed screw which is advanced and retracted through said housing, said housing being formed of tubular sections secured in end to end relation, the forward section receiving said countershaft and said feed screw and being formed with a bore surrounding said countershaft and within which said indexing apparatus has a sliding fit.

2. In a light, portable diamond drill having a rotatable feed screw, a rotatable feed nut engaged with said feed screw by a thread connection operative to advance and retract said screw in response to relative rotary movement between said elements, and a motor; the combination of a countershaft paralleling the axes of said motor, said feed screw and said feed nut; means establishing a continuous driving connection between said motor and said countershaft and feed screw; selectively operable mechanisms for imparting the rotation of said countershaft to said feed nut, each of said mechanisms having a gear wheel rotatably mounted on said shaft; selection means slidable longitudinally of said countershaft for establishing a driving connection between each of said gear wheels and said countershaft; a rack and pinion device for moving said selection means; and a dust proof tubular housing completely enclosing the operating parts of the drill including the motor except for manipulative control elements outside the housing including means for controlling the motor and for operating said rack and pinion device.

3. In a light, portable diamond drill having a rotatable feed screw, a rotatable feed nut engaged with said feed screw by a threaded connection operative to advance and retract said screw in response to relative rotary movement between said elements, and a motor; the combination of a countershaft paralleling the axes of said motor, said feed screw and said feed nut; means establishing a continuous driving connection between said motor and said countershaft and feed screw; selectively operable mechanism for imparting the rotation of said countershaft to said feed nut; selection means for conditioning said mechanisms for operation, said selection means having a neutral position in which none of said mechanisms is effective; means for locking said feed nut against rotation; and a dust proof tubular housing completely enclosing the operating parts of the drill including the motor except for manipulative control elements extending outside the wall of the housing and including means for operating said selection means and means for operating said locking means.

HENRY O. FOSSUM.